(No Model.) 2 Sheets—Sheet 1.

W. A. WOODS & C. C. GARCELON.
ORE CONCENTRATOR.

No. 347,909. Patented Aug. 24, 1886.

Witnesses,
Geo. H. Strong.
J. H. Rouse

Inventors,
Wm. A. Woods
Chas. C. Garcelon
By Dewey & Co.
Attys (No Model.) 2 Sheets—Sheet 2.

W. A. WOODS & C. C. GARCELON.
ORE CONCENTRATOR.

No. 347,909. Patented Aug. 24, 1886.

Witnesses,
Geo. H. Strong
J. H. Nourse

Inventors,
Wm. A. Woods
Chas. C. Garcelon
By Dewey & Co.
Attys

UNITED STATES PATENT OFFICE.

WILLIAM A. WOODS AND CHARLES C. GARCELON, OF SANTA CRUZ, CAL.

ORE-CONCENTRATOR.

SPECIFICATION forming part of Letters Patent No. 347,909, dated August 24, 1886.

Application filed March 13, 1886. Serial No. 195,173. (No model.)

*To all whom it may concern:*

Be it known that we, WILLIAM A. WOODS and CHARLES C. GARCELON, both of Santa Cruz, Santa Cruz county, State of California, have invented an Improvement in Ore-Concentrators; and we hereby declare the following to be a full, clear, and exact description of the same.

Our invention relates to the class of ore-concentrators; and the machine comprises a main frame, a suspended frame, mechanism for eccentrically shaking it, pans with distributing-plates, discharge-spouts under the pans, a hopper above them, the pans, spouts, and hopper being carried by the shaking-frame, a feed-chute above the hopper, and means for longitudinally reciprocating it, and various details of construction and combination of parts, all of which we shall hereinafter fully describe and claim.

The object of our invention is to provide an effective machine for concentrating ores, either by the dry or wet process.

Figure 1:
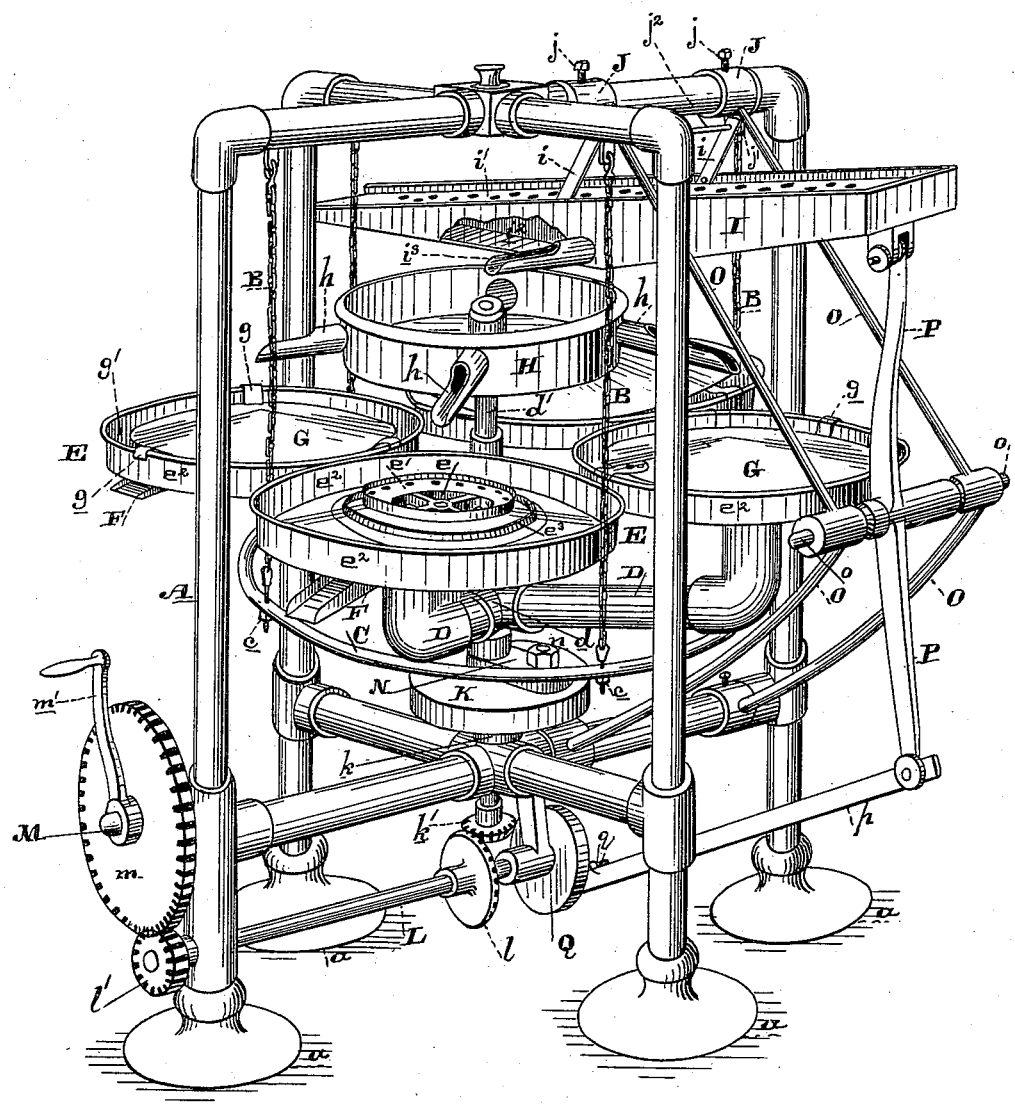
Figure 2:
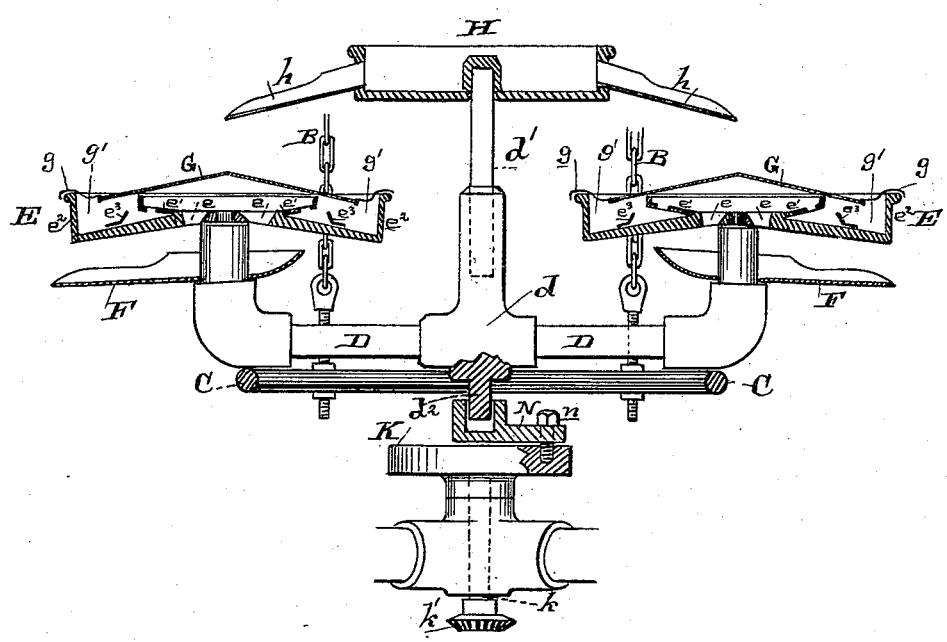

Referring to the accompanying drawings for a more complete explanation of our invention, Figure 1 is a perspective view of our ore-concentrator, the distributing-plate G of one pan being omitted and a portion of the side of the feed-chute I being broken away. Fig. 2 is a part section and part elevation, showing the pan-carrying frame, the pans, spouts, hopper, and eccentric-arm N.

A is a frame, made, preferably, of gas-pipe sections secured together by suitable elbow and other connections or couplings and provided with feet $a$ for stability. Suspended by chains B or other flexible connections from the top of the frame is a ring, C, on which are supported the radial arms D of the pan-carrying frame, of which $d$ is the hub. The ring may be vertically adjusted by screws $c$, with which the chains are connected. The outer ends of arms D, which are here shown as four in number, are turned upwardly and receive and support the pans E. These pans have annular or sectional openings $e$ at their centers, around which are perforated flanges $e'$, and the bottoms of the pans slope from the center downwardly to their rims $e^2$. In the pans are the concentric riffles $e^3$, having centrally-inclined flanges. The riffles are used only when water is used in the operation. Under the pans, and supported by the upturned ends of the arms D, are discharge-spouts F, which are directly under the central openings of the pans.

G are distributing-plates having a slightly conical form and provided with arms $g$, extending from their peripheries, whereby they are hung from the rims of the pans. The diameter of each distributer is less than that of the pan, so that when suspended within the pan an annular space, $g'$, is left between its periphery and the rim of the pan. Extending upwardly from the hub $d$ of the pan-carrying frame is a spindle, $d'$, on the top of which is secured a hopper, H, from which radiate discharge-spouts $h$, the outer ends of which lie directly above the apexes of the distributors G. I is a long inclined feed-chute suspended from the top of frame A by the links $i$. These links may be pivoted to the frame in any suitable manner, though we have used the collars J, set by screws $j$ on the frame top, and having ears $j'$, in which is mounted a short shaft, $j^2$, on which the upper ends of the links are pivoted, their lower ends being pivoted to the sides of the feed-chute. The feed-chute has a perforated false bottom, $i'$, forming a chamber, $i^2$, below it, the bottom of which slopes downwardly from each end to the center, where a discharge-spout, $i^3$, is provided, the outer end of which lies directly over the hopper H.

An eccentric shaking motion is imparted to the pans by the following mechanism: K is a disk or plate having a stem, $k$, which is journaled in the center of the base of frame A, and is provided with a beveled pinion, $k'$, on its lower end. L is a shaft journaled in suitable bearings in the frame, and having a bevel-pinion, $l$, on its inner end, engaging the pinion $k'$, and a pinion, $l'$, on its outer end. M is a short counter-shaft, on which is mounted a gear, $m$, engaging pinion $l'$, and provided with a crank, $m'$, as a power device. A rotary motion is thus transmitted to the disk or plate K. N is an eccentric-arm, secured at one end to the disk or plate K, off the center, by a screw, $n$. Its other end is free, and may be turned to any position off the center of the disk by loosening the screw $n$, and may be there fixed by again tightening the screw. This arm is only another form of an eccentric-pin, and we use it on account of the ease with which it is adjusted. The inner end of the eccentric-arm is provided with a socket in which is loosely pivoted a pin, $d^2$, extending downwardly from the hub $d$ of the pan-carrying frame. It will thus be seen that the suspended pan-carrying frame has an eccentric shaking motion imparted to it, and the throw or degree of this motion is governed by the adjustment of the eccentric-arm N on the plate or disk K.

The feed-chute I has a longitudinal reciprocating motion given it by the following means: O is a bracket, supported top and bottom from the main frame, and it carries a shaft, $o$, in its outer end. On this shaft is pivoted a lever, P, the upper end of which is pivoted under one end of the feed-chute I. Its lower end has connected with it a rod, $p$, the other end of which is connected with a crank-pin, $q$, on a crank-disk, Q, fixed on the projecting inner end of the drive-shaft L. The rotation of shaft L therefore imparts, through its crank-disk Q, connecting-rod $p$, and lever P, a reciprocating motion to the chute, which is guided by the upper arms of the bracket O.

The operation of our machine is as follows: The auriferous ore, sand, earth, or gravel, either with or without water, is supplied to the chute I. Here, on account of the shaking motion of the chute and its inclined screen-surface or perforated false bottom, the larger and coarser rocks and stuff pass off and are discharged from the lower end of the chute. The finer material passes through the screen-surface into the chamber below and out through the discharge-spout $i^3$ into the hopper H. From this, on account of the eccentric shaking motion, it passes out through the radial discharges $h$ in equal quantities upon the distributers G, upon the centers or apexes of which it falls. Thence, radiating in all directions down said distributers, it is passed into the pans through the annular openings or spaces $g'$, between the rims of the distributers and the rims of the pans. In the pans, on account of their shaking motion and their sloping bottoms, the heavier and more precious particles of the material are concentrated and remain near the outer rims, while the lighter and worthless particles work upwardly to and through the perforated annular flanges $e'$, which act as skimmers, taking the material from the top and down through the central openings, $e$, into the spouts F, from which they are discharged. When water is used in the operation, the riffles $e^3$ in the bottoms of the pans are used, though in dry separation they are not needed. In order to get at the concentrations the distributers are lifted off, and the pans may also be lifted off the upturned ends of the arms D.

By using suitable copper plates the machine may be used for amalgamation.

Having thus described our invention, what we claim as new, and desire to secure by Letters Patent, is—

1. In an ore-concentrator, the shaking-pans having central discharge-apertures, $e$, the perforated flanges $e'$, the conical distributers G, and the arms $g'$, by which the distributers are suspended within the pans, in combination with a hopper above having spouts for discharging the material upon the apex of the distributers, and discharge-spouts below for receiving the material from the centers of the pans, substantially as described.

2. In an ore-concentrator, the shaking-pans E, having central discharges, and the conical distributers G, of less diameter than said pans and suspended within them, in combination with a shaking-screen above having a discharge-spout, a hopper with which said spout communicates, having spouts for discharging the material upon the apexes of the distributers, and discharge spouts below for receiving the material from the centers of the pans, substantially as herein described.

3. In an ore-concentrator, a main frame, a pan-carrying frame comprising the ring C, arms D, and flexible connections and mechanism for shaking said pan-carrying frame, in combination with the pans E, carried by said pan-carrying frame, substantially as described.

4. In an ore-concentrator, a main frame, a pan-carrying frame, the flexible connections, and the mechanism for shaking said pan-carrying frame, in combination with the pans E, and the hopper H, carried by the shaking-frame, substantially as herein described.

5. In an ore-concentrator, a main frame, a pan-carrying frame, the flexible connections, and the mechanism for shaking said pan-carrying frame, in combination with the pans E, having central discharges, the conical distributers G, of smaller diameter than the pans and suspended within them, the hopper H above, having spouts $h$, for discharging upon the apexes of the distributers, and the spouts F below the central discharges of the pans, said pans, hopper, and spouts F all being carried by the shaking-frame, substantially as herein described.

6. In an ore-concentrator, the main frame A and the pan-carrying frame consisting of the ring C, the radial arms D, having upturned ends, and the hub $d$, having central spindle, $d'$, the chains B, suspending ring C from the main frame, and mechanism for shaking said frame, in combination with the pans E, seated on the upturned ends of the arms D, and having central discharges, $e$, the spouts F on arms D and below the central discharges, the conical distributers G, of less diameter than the pans and suspended in them, and the hopper H on the spindle $d'$, having spouts $h$, for discharging on the apexes of the distributers, substantially as herein described.

7. In an ore-concentrator, the main frame A, the pan-carrying frame, and the flexible connections, in combination with the means for imparting a shaking movement to said pan-carrying frame, consisting of the plate or disk K, journaled in the base of the main frame, the adjustable arm N, connected with the plate or disk and eccentrically located thereon, a pivot-connection between the center of the pan-carrying frame and the arm N, and gearing for rotating said plate or disk K, substantially as herein described.

8. In an ore-concentrator, the main frame A, the pan-carrying frame, and the flexible connections, in combination with the means for imparting a shaking movement to said pan-carrying frame, consisting of the plate or disk K, having a stem, $k$, journaled in the base of the main frame, the adjustable arm N, connected with the plate or disk and eccentrically located thereon, a pivot-connection between the center of the pan-carrying frame and the arm, the pinion $k'$ on the stem of the plate or disk K, the rotating drive-shaft L, and the pinion $l$ thereon, substantially as herein described.

9. In an ore-concentrator, the main frame A, the pan-carrying frame comprising the ring C, the radial arms D, supporting the pans, the hub $d$, having a downwardly-extending pin, $d^2$, and the chains B, suspending the pan-carrying frame from the main frame, in combination with the means for imparting a shaking movement to the pan-carrying frame, consisting of the plate or disk K, centrally journaled in the base of the main frame, gearing for rotating it, the adjustable arm N, secured to the plate or disk and eccentrically located thereon, and receiving the pin $d^2$ of the hub of the pan-carrying frame, substantially as herein described.

10. In an ore-concentrator, the main frame A, the pan-carrying frame consisting of the ring C, the radial arms D, having upturned ends, the hub $d$, having a central spindle, $d'$, and a downwardly-extending pin, $d^2$, the chains B, suspending the pan-carrying frame from the main frame, and the mechanism for imparting to said frame a shaking motion, consisting of the plate or disk K, centrally journaled in the base of the main frame, gearing for rotating it, and the adjustable arm N, secured to the plate or disk and eccentrically located thereon, said arm receiving the pin $d^2$, in combination with the pans E, seated on the upturned ends of arms D, and having central discharges, $e$, the spouts F on arms D, and below the central discharges, the conical distributers G, of less diameter than the pans and suspended in them, and the hopper H on the spindle $d'$, having spouts $h$, for discharging on the apex of the distributers, substantially as herein described.

11. In an ore-concentrator, the frame A and the bracket O, having shaft $o$, in combination with the inclined feed-chute I, the pivoted links $i$, suspending it from the main frame, and the means for imparting a longitudinal reciprocating motion to the chute, consisting of the lever P, pivoted on the shaft $o$ and connected with the chute, the drive-shaft L, having crank-disk Q and the pin $q$, and the connecting-rod $p$, between said pin and the lever P, substantially as herein described.

In witness whereof we have hereunto set our hands.

WILLIAM A. WOODS.
CHARLES C. GARCELON.

Witnesses:
S. H. NOURSE,
H. C. LEE.